US009609052B2

(12) United States Patent
Jalan et al.

(10) Patent No.: US 9,609,052 B2
(45) Date of Patent: Mar. 28, 2017

(54) DISTRIBUTING APPLICATION TRAFFIC TO SERVERS BASED ON DYNAMIC SERVICE RESPONSE TIME

(75) Inventors: Rajkumar Jalan, Saratoga, CA (US); Ronald Wai Lun Szeto, San Francisco, CA (US); Feilong Xu, Fremont, CA (US)

(73) Assignee: A10 Networks, Inc., San Jose, CA (US)

( * ) Notice: Subject to any disclaimer, the term of this patent is extended or adjusted under 35 U.S.C. 154(b) by 640 days.

(21) Appl. No.: 12/958,435

(22) Filed: Dec. 2, 2010

(65) Prior Publication Data

US 2012/0144015 A1    Jun. 7, 2012

(51) Int. Cl.
G06F 15/173 (2006.01)
H04L 29/08 (2006.01)
H04L 12/26 (2006.01)
G06F 9/50 (2006.01)
H04L 12/24 (2006.01)

(52) U.S. Cl.
CPC .......... H04L 67/1008 (2013.01); G06F 9/505 (2013.01); H04L 43/0817 (2013.01); H04L 67/28 (2013.01); H04L 41/5038 (2013.01); H04L 67/14 (2013.01); H04L 67/322 (2013.01)

(58) Field of Classification Search
CPC .................................................. H04L 67/1008
USPC ................................................. 709/223–225
See application file for complete search history.

(56) References Cited

U.S. PATENT DOCUMENTS

| 5,218,602 A | * | 6/1993 | Grant .................... H04L 49/101 370/390 |
|---|---|---|---|
| 5,774,660 A | | 6/1998 | Brendel et al. |
| 5,935,207 A | | 8/1999 | Logue et al. |
| 5,958,053 A | | 9/1999 | Denker |
| 5,995,981 A | | 11/1999 | Wikstrom |
| 6,003,069 A | | 12/1999 | Cavill |
| 6,047,268 A | | 4/2000 | Bartoli et al. |
| 6,131,163 A | | 10/2000 | Wiegel |
| 6,219,706 B1 | | 4/2001 | Fan et al. |
| 6,259,705 B1 | | 7/2001 | Takahashi et al. |
| 6,321,338 B1 | | 11/2001 | Porras et al. |
| 6,374,300 B2 | | 4/2002 | Masters |
| 6,459,682 B1 | | 10/2002 | Ellesson et al. |
| 6,587,866 B1 | | 7/2003 | Modi et al. |

(Continued)

FOREIGN PATENT DOCUMENTS

| CN | 1372662 A | 10/2002 |
|---|---|---|
| CN | 1449618 | 10/2003 |

(Continued)

OTHER PUBLICATIONS

Spatscheck et al., "Optimizing TCP Forwarder Performance", IEEE/ACM Transactions on Networking, vol. 8, No. 2, Apr. 2000.

(Continued)

*Primary Examiner* — Jason Recek
(74) *Attorney, Agent, or Firm* — Carr & Ferrell LLP

(57) ABSTRACT

A service gateway processes a service request received from a host by: relaying the service request from the service gateway to a server over a service session between the service gateway and the server; determining a service request time for the service session; receiving by the service gateway a service response from the server; determining by the service gateway a service response time; calculating by the service gateway a service processing time for the service request from the service request time and the service response time; comparing the service processing time with an expected service processing time; and updating a server busy indicator for the server in response to the comparing. If the service processing time exceeds the expected service processing time, the server busy indicator is updated to indicate that the server is busy. Otherwise, the server busy indicator is updated to indicate that the server is not busy.

21 Claims, 8 Drawing Sheets

(56) References Cited

U.S. PATENT DOCUMENTS

| | | |
|---|---|---|
| 6,748,414 B1 | 6/2004 | Bournas |
| 6,772,334 B1 | 8/2004 | Glawitsch |
| 6,779,017 B1 | 8/2004 | Lamberton et al. |
| 6,779,033 B1 | 8/2004 | Watson et al. |
| 6,952,728 B1 | 10/2005 | Alles et al. |
| 7,010,605 B1 | 3/2006 | Dharmarajan |
| 7,013,482 B1 | 3/2006 | Krumel |
| 7,058,718 B2 | 6/2006 | Fontes et al. |
| 7,069,438 B2 | 6/2006 | Balabine et al. |
| 7,076,555 B1 | 7/2006 | Orman et al. |
| 7,143,087 B2 | 11/2006 | Fairweather |
| 7,181,524 B1 | 2/2007 | Lele |
| 7,218,722 B1* | 5/2007 | Turner ............... H04L 12/66 370/352 |
| 7,228,359 B1 | 6/2007 | Monteiro |
| 7,234,161 B1 | 6/2007 | Maufer et al. |
| 7,236,457 B2 | 6/2007 | Joe |
| 7,254,133 B2 | 8/2007 | Govindarajan et al. |
| 7,269,850 B2 | 9/2007 | Govindarajan et al. |
| 7,277,963 B2 | 10/2007 | Dolson et al. |
| 7,301,899 B2 | 11/2007 | Goldstone |
| 7,308,499 B2 | 12/2007 | Chavez |
| 7,310,686 B2 | 12/2007 | Uysal |
| 7,328,267 B1 | 2/2008 | Bashyam et al. |
| 7,334,232 B2 | 2/2008 | Jacobs et al. |
| 7,337,241 B2 | 2/2008 | Boucher et al. |
| 7,343,399 B2 | 3/2008 | Hayball et al. |
| 7,349,970 B2 | 3/2008 | Clement et al. |
| 7,370,353 B2 | 5/2008 | Yang |
| 7,391,725 B2 | 6/2008 | Huitema et al. |
| 7,398,317 B2 | 7/2008 | Chen et al. |
| 7,423,977 B1 | 9/2008 | Joshi |
| 7,430,755 B1 | 9/2008 | Hughes et al. |
| 7,463,648 B1 | 12/2008 | Eppstein et al. |
| 7,467,202 B2 | 12/2008 | Savchuk |
| 7,472,190 B2 | 12/2008 | Robinson |
| 7,492,766 B2 | 2/2009 | Cabeca et al. |
| 7,506,360 B1 | 3/2009 | Wilkinson et al. |
| 7,509,369 B1 | 3/2009 | Tormasov |
| 7,512,980 B2 | 3/2009 | Copeland et al. |
| 7,533,409 B2 | 5/2009 | Keane et al. |
| 7,552,323 B2 | 6/2009 | Shay |
| 7,584,262 B1 | 9/2009 | Wang et al. |
| 7,584,301 B1 | 9/2009 | Joshi |
| 7,590,736 B2 | 9/2009 | Hydrie et al. |
| 7,613,193 B2 | 11/2009 | Swami et al. |
| 7,613,822 B2 | 11/2009 | Joy et al. |
| 7,673,072 B2 | 3/2010 | Boucher et al. |
| 7,675,854 B2 | 3/2010 | Chen et al. |
| 7,703,102 B1 | 4/2010 | Eppstein et al. |
| 7,707,295 B1 | 4/2010 | Szeto et al. |
| 7,711,790 B1 | 5/2010 | Barrett et al. |
| 7,739,395 B1 | 6/2010 | Parlamas et al. |
| 7,747,748 B2 | 6/2010 | Allen |
| 7,751,409 B1 | 7/2010 | Carolan |
| 7,765,328 B2 | 7/2010 | Bryers et al. |
| 7,792,113 B1 | 9/2010 | Foschiano et al. |
| 7,808,994 B1 | 10/2010 | Vinokour et al. |
| 7,826,487 B1 | 11/2010 | Mukerji et al. |
| 7,881,215 B1 | 2/2011 | Daigle et al. |
| 7,948,952 B2 | 5/2011 | Hurtta et al. |
| 7,970,934 B1 | 6/2011 | Patel |
| 7,983,258 B1 | 7/2011 | Ruben et al. |
| 7,990,847 B1 | 8/2011 | Leroy et al. |
| 7,991,859 B1 | 8/2011 | Miller et al. |
| 8,019,870 B1 | 9/2011 | Eppstein et al. |
| 8,032,634 B1 | 10/2011 | Eppstein et al. |
| 8,090,866 B1 | 1/2012 | Bashyam et al. |
| 8,122,116 B2 | 2/2012 | Matsunaga et al. |
| 8,179,809 B1 | 5/2012 | Eppstein et al. |
| 8,185,651 B2 | 5/2012 | Moran et al. |
| 8,191,106 B2 | 5/2012 | Choyi et al. |
| 8,224,971 B1 | 7/2012 | Miller et al. |
| 8,266,235 B2 | 9/2012 | Jalan et al. |
| 8,296,434 B1 | 10/2012 | Miller et al. |
| 8,312,507 B2 | 11/2012 | Chen et al. |
| 8,379,515 B1 | 2/2013 | Mukerji |
| 8,499,093 B2 | 7/2013 | Grosser et al. |
| 8,539,075 B2 | 9/2013 | Bali et al. |
| 8,554,929 B1 | 10/2013 | Szeto et al. |
| 8,560,693 B1 | 10/2013 | Wang et al. |
| 8,584,199 B1 | 11/2013 | Chen et al. |
| 8,595,791 B1 | 11/2013 | Chen et al. |
| RE44,701 E | 1/2014 | Chen et al. |
| 8,675,488 B1 | 3/2014 | Sidebottom et al. |
| 8,681,610 B1 | 3/2014 | Mukerji |
| 8,750,164 B2 | 6/2014 | Casado et al. |
| 8,782,221 B2 | 7/2014 | Han |
| 8,813,180 B1 | 8/2014 | Chen et al. |
| 8,826,372 B1 | 9/2014 | Chen et al. |
| 8,879,427 B2 | 11/2014 | Krumel |
| 8,885,463 B1 | 11/2014 | Medved et al. |
| 8,897,154 B2 | 11/2014 | Jalan et al. |
| 8,965,957 B2 | 2/2015 | Barros |
| 8,977,749 B1 | 3/2015 | Han |
| 8,990,262 B2 | 3/2015 | Chen et al. |
| 9,094,364 B2 | 7/2015 | Jalan et al. |
| 9,106,561 B2 | 8/2015 | Jalan et al. |
| 9,154,577 B2 | 10/2015 | Jalan et al. |
| 9,154,584 B1 | 10/2015 | Han |
| 9,215,275 B2 | 12/2015 | Kannan et al. |
| 9,219,751 B1 | 12/2015 | Chen et al. |
| 9,253,152 B1 | 2/2016 | Chen et al. |
| 9,270,705 B1 | 2/2016 | Chen et al. |
| 9,270,774 B2 | 2/2016 | Jalan et al. |
| 9,338,225 B2 | 5/2016 | Jalan et al. |
| 9,350,744 B2 | 5/2016 | Chen et al. |
| 9,356,910 B2 | 5/2016 | Chen et al. |
| 9,386,088 B2 | 7/2016 | Zheng et al. |
| 2001/0049741 A1 | 12/2001 | Skene et al. |
| 2002/0032777 A1 | 3/2002 | Kawata et al. |
| 2002/0078164 A1 | 6/2002 | Reinschmidt |
| 2002/0091844 A1 | 7/2002 | Craft et al. |
| 2002/0103916 A1 | 8/2002 | Chen et al. |
| 2002/0133491 A1 | 9/2002 | Sim et al. |
| 2002/0138618 A1 | 9/2002 | Szabo |
| 2002/0143991 A1 | 10/2002 | Chow et al. |
| 2002/0178259 A1 | 11/2002 | Doyle et al. |
| 2002/0191575 A1 | 12/2002 | Kalavade et al. |
| 2002/0194335 A1 | 12/2002 | Maynard |
| 2002/0194350 A1 | 12/2002 | Lu et al. |
| 2003/0009591 A1 | 1/2003 | Hayball et al. |
| 2003/0014544 A1 | 1/2003 | Pettey |
| 2003/0023711 A1 | 1/2003 | Parmar et al. |
| 2003/0023873 A1 | 1/2003 | Ben-Itzhak |
| 2003/0035409 A1 | 2/2003 | Wang et al. |
| 2003/0035420 A1 | 2/2003 | Niu |
| 2003/0065762 A1 | 4/2003 | Stolorz et al. |
| 2003/0091028 A1* | 5/2003 | Chang ............... H04M 7/0057 370/352 |
| 2003/0131245 A1 | 7/2003 | Linderman |
| 2003/0135625 A1 | 7/2003 | Fontes et al. |
| 2003/0195962 A1 | 10/2003 | Kikuchi et al. |
| 2004/0062246 A1 | 4/2004 | Boucher et al. |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0111516 A1 | 6/2004 | Cain |
| 2004/0128312 A1 | 7/2004 | Shalabi et al. |
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0187032 A1 | 9/2004 | Gels et al. |
| 2004/0199616 A1* | 10/2004 | Karhu ............... 709/221 |
| 2004/0199646 A1 | 10/2004 | Susai et al. |
| 2004/0202182 A1 | 10/2004 | Lund et al. |
| 2004/0210623 A1 | 10/2004 | Hydrie et al. |
| 2004/0210663 A1* | 10/2004 | Phillips et al. ............... 709/230 |
| 2004/0213158 A1 | 10/2004 | Collett et al. |
| 2004/0268358 A1 | 12/2004 | Darling et al. |
| 2005/0005207 A1 | 1/2005 | Herneque |
| 2005/0009520 A1 | 1/2005 | Herrero et al. |
| 2005/0021848 A1 | 1/2005 | Jorgenson |

(56) References Cited

U.S. PATENT DOCUMENTS

| | | |
|---|---|---|
| 2005/0027862 A1 | 2/2005 | Nguyen et al. |
| 2005/0036501 A1 | 2/2005 | Chung et al. |
| 2005/0036511 A1 | 2/2005 | Baratakke et al. |
| 2005/0044270 A1 | 2/2005 | Grove et al. |
| 2005/0074013 A1 | 4/2005 | Hershey et al. |
| 2005/0080890 A1 | 4/2005 | Yang et al. |
| 2005/0102400 A1 | 5/2005 | Nakahara et al. |
| 2005/0125276 A1 | 6/2005 | Rusu |
| 2005/0163073 A1 | 7/2005 | Heller et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2005/0259586 A1 | 11/2005 | Hafid et al. |
| 2005/0289231 A1* | 12/2005 | Harada ................ G06Q 10/00 709/224 |
| 2006/0023721 A1 | 2/2006 | Miyake et al. |
| 2006/0036610 A1 | 2/2006 | Wang |
| 2006/0036733 A1 | 2/2006 | Fujimoto et al. |
| 2006/0064478 A1 | 3/2006 | Sirkin |
| 2006/0069774 A1 | 3/2006 | Chen et al. |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0209789 A1 | 9/2006 | Gupta et al. |
| 2006/0230129 A1 | 10/2006 | Swami et al. |
| 2006/0233100 A1 | 10/2006 | Luft et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0019543 A1 | 1/2007 | Wei et al. |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0156919 A1 | 7/2007 | Potti et al. |
| 2007/0165622 A1 | 7/2007 | O'Rourke et al. |
| 2007/0185998 A1 | 8/2007 | Touitou et al. |
| 2007/0195792 A1 | 8/2007 | Chen et al. |
| 2007/0230337 A1 | 10/2007 | Igarashi et al. |
| 2007/0245090 A1 | 10/2007 | King et al. |
| 2007/0259673 A1 | 11/2007 | Willars et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0031263 A1 | 2/2008 | Ervin et al. |
| 2008/0101396 A1 | 5/2008 | Miyata |
| 2008/0109452 A1* | 5/2008 | Patterson ........................ 707/10 |
| 2008/0109870 A1 | 5/2008 | Sherlock et al. |
| 2008/0134332 A1 | 6/2008 | Keohane et al. |
| 2008/0162679 A1 | 7/2008 | Maher et al. |
| 2008/0228781 A1 | 9/2008 | Chen et al. |
| 2008/0250099 A1 | 10/2008 | Shen et al. |
| 2008/0263209 A1 | 10/2008 | Pisharody et al. |
| 2008/0271130 A1 | 10/2008 | Ramamoorthy |
| 2008/0282254 A1 | 11/2008 | Blander et al. |
| 2008/0291911 A1 | 11/2008 | Lee et al. |
| 2009/0049198 A1 | 2/2009 | Blinn et al. |
| 2009/0070470 A1 | 3/2009 | Bauman et al. |
| 2009/0077651 A1 | 3/2009 | Poeluev |
| 2009/0092124 A1 | 4/2009 | Singhal et al. |
| 2009/0106830 A1 | 4/2009 | Maher |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1* | 7/2009 | Matsubara ................ 709/203 |
| 2009/0213858 A1 | 8/2009 | Dolganow et al. |
| 2009/0222583 A1 | 9/2009 | Josefsberg et al. |
| 2009/0227228 A1 | 9/2009 | Hu et al. |
| 2009/0228547 A1* | 9/2009 | Miyaoka et al. ............ 709/203 |
| 2009/0262741 A1 | 10/2009 | Jungck et al. |
| 2009/0271472 A1 | 10/2009 | Scheifler et al. |
| 2009/0313379 A1 | 12/2009 | Rydnell et al. |
| 2010/0008229 A1 | 1/2010 | Bi et al. |
| 2010/0023621 A1 | 1/2010 | Ezolt et al. |
| 2010/0036952 A1 | 2/2010 | Hazlewood et al. |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0082787 A1 | 4/2010 | Kommula et al. |
| 2010/0083076 A1* | 4/2010 | Ushiyama ................ 714/798 |
| 2010/0094985 A1* | 4/2010 | Abu-Samaha et al. ....... 709/223 |
| 2010/0098417 A1 | 4/2010 | Tse-Au |
| 2010/0106833 A1 | 4/2010 | Banerjee et al. |
| 2010/0106854 A1 | 4/2010 | Kim et al. |
| 2010/0128606 A1 | 5/2010 | Patel et al. |
| 2010/0162378 A1 | 6/2010 | Jayawardena et al. |
| 2010/0210265 A1 | 8/2010 | Borzsei et al. |
| 2010/0217793 A1 | 8/2010 | Preiss |
| 2010/0217819 A1 | 8/2010 | Chen et al. |
| 2010/0223630 A1 | 9/2010 | Degenkolb et al. |
| 2010/0228819 A1 | 9/2010 | Wei |
| 2010/0228878 A1 | 9/2010 | Xu et al. |
| 2010/0235507 A1 | 9/2010 | Szeto et al. |
| 2010/0235522 A1 | 9/2010 | Chen et al. |
| 2010/0235880 A1* | 9/2010 | Chen et al. ........................ 726/1 |
| 2010/0238828 A1 | 9/2010 | Russell |
| 2010/0265824 A1 | 10/2010 | Chao et al. |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0019550 A1 | 1/2011 | Bryers et al. |
| 2011/0023071 A1* | 1/2011 | Li et al. ........................ 725/87 |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0060831 A1 | 3/2011 | Ishii et al. |
| 2011/0060840 A1* | 3/2011 | Susai ................ H04L 29/06 709/229 |
| 2011/0093522 A1 | 4/2011 | Chen et al. |
| 2011/0099403 A1 | 4/2011 | Miyata et al. |
| 2011/0110294 A1 | 5/2011 | Valluri et al. |
| 2011/0145324 A1 | 6/2011 | Reinart et al. |
| 2011/0153834 A1 | 6/2011 | Bharrat |
| 2011/0178985 A1 | 7/2011 | San Martin Arribas et al. |
| 2011/0185073 A1 | 7/2011 | Jagadeeswaran et al. |
| 2011/0191773 A1* | 8/2011 | Pavel et al. ................ 718/100 |
| 2011/0196971 A1 | 8/2011 | Reguraman et al. |
| 2011/0276695 A1 | 11/2011 | Maldaner |
| 2011/0276982 A1 | 11/2011 | Nakayama et al. |
| 2011/0289496 A1* | 11/2011 | Steer ................................ 717/169 |
| 2011/0292939 A1 | 12/2011 | Subramaian et al. |
| 2011/0302256 A1 | 12/2011 | Sureshehandra et al. |
| 2011/0307541 A1 | 12/2011 | Walsh et al. |
| 2012/0008495 A1 | 1/2012 | Shen et al. |
| 2012/0023231 A1 | 1/2012 | Ueno |
| 2012/0026897 A1 | 2/2012 | Guichard et al. |
| 2012/0030341 A1 | 2/2012 | Jensen et al. |
| 2012/0066371 A1 | 3/2012 | Patel et al. |
| 2012/0084419 A1* | 4/2012 | Kannan et al. ................ 709/223 |
| 2012/0084460 A1 | 4/2012 | McGinnity et al. |
| 2012/0106355 A1 | 5/2012 | Ludwig |
| 2012/0117571 A1 | 5/2012 | Davis et al. |
| 2012/0144014 A1 | 6/2012 | Natham et al. |
| 2012/0151353 A1 | 6/2012 | Joanny |
| 2012/0170548 A1 | 7/2012 | Rajagopalan et al. |
| 2012/0173759 A1 | 7/2012 | Agarwal et al. |
| 2012/0179770 A1 | 7/2012 | Jalan et al. |
| 2012/0191839 A1 | 7/2012 | Maynard |
| 2012/0239792 A1 | 9/2012 | Banerjee et al. |
| 2012/0240185 A1 | 9/2012 | Kapoor et al. |
| 2012/0290727 A1 | 11/2012 | Tivig |

(56) References Cited

U.S. PATENT DOCUMENTS

| | | |
|---|---|---|
| 2012/0297046 A1 | 11/2012 | Raja et al. |
| 2012/0311116 A1 | 12/2012 | Jalan et al. |
| 2013/0046876 A1 | 2/2013 | Narayana et al. |
| 2013/0058335 A1 | 3/2013 | Koponen et al. |
| 2013/0074177 A1 | 3/2013 | Varadhan et al. |
| 2013/0083725 A1 | 4/2013 | Mallya et al. |
| 2013/0100958 A1 | 4/2013 | Jalan et al. |
| 2013/0124713 A1 | 5/2013 | Feinberg et al. |
| 2013/0136139 A1 | 5/2013 | Zheng et al. |
| 2013/0148500 A1 | 6/2013 | Sonoda et al. |
| 2013/0166762 A1 | 6/2013 | Jalan et al. |
| 2013/0173795 A1 | 7/2013 | McPherson |
| 2013/0176854 A1 | 7/2013 | Chisu et al. |
| 2013/0191486 A1 | 7/2013 | Someya et al. |
| 2013/0198385 A1 | 8/2013 | Han et al. |
| 2013/0250765 A1 | 9/2013 | Ehsan et al. |
| 2013/0250770 A1 | 9/2013 | Zou et al. |
| 2013/0258846 A1 | 10/2013 | Damola |
| 2013/0268646 A1 | 10/2013 | Doron et al. |
| 2013/0282791 A1 | 10/2013 | Kruglick |
| 2013/0336159 A1 | 12/2013 | Previdi et al. |
| 2014/0012972 A1 | 1/2014 | Han |
| 2014/0089500 A1 | 3/2014 | Sankar et al. |
| 2014/0164617 A1 | 6/2014 | Jalan et al. |
| 2014/0169168 A1 | 6/2014 | Jalan et al. |
| 2014/0207845 A1 | 7/2014 | Han et al. |
| 2014/0226658 A1 | 8/2014 | Kakadia et al. |
| 2014/0235249 A1 | 8/2014 | Jeong et al. |
| 2014/0248914 A1 | 9/2014 | Aoyagi et al. |
| 2014/0258465 A1 | 9/2014 | Li |
| 2014/0258536 A1 | 9/2014 | Chiong |
| 2014/0269728 A1 | 9/2014 | Jalan et al. |
| 2014/0286313 A1 | 9/2014 | Fu et al. |
| 2014/0298091 A1 | 10/2014 | Carlen et al. |
| 2014/0325649 A1 | 10/2014 | Zhang |
| 2014/0330982 A1 | 11/2014 | Jalan et al. |
| 2014/0334485 A1 | 11/2014 | Jain et al. |
| 2014/0359052 A1 | 12/2014 | Joachimpillai et al. |
| 2015/0039671 A1 | 2/2015 | Jalan et al. |
| 2015/0098333 A1 | 4/2015 | Lin et al. |
| 2015/0156223 A1 | 6/2015 | Xu et al. |
| 2015/0215436 A1 | 7/2015 | Kancherla |
| 2015/0237173 A1 | 8/2015 | Virkki et al. |
| 2015/0281087 A1 | 10/2015 | Jalan et al. |
| 2015/0281104 A1 | 10/2015 | Golshan et al. |
| 2015/0296058 A1 | 10/2015 | Jalan et al. |
| 2015/0312268 A1 | 10/2015 | Ray |
| 2015/0333988 A1 | 11/2015 | Jalan et al. |
| 2015/0350048 A1 | 12/2015 | Sampat et al. |
| 2015/0350379 A1 | 12/2015 | Jalan et al. |
| 2016/0014052 A1 | 1/2016 | Han |
| 2016/0036778 A1 | 2/2016 | Chen et al. |
| 2016/0042014 A1 | 2/2016 | Jalan et al. |
| 2016/0043901 A1 | 2/2016 | Sankar et al. |
| 2016/0044095 A1 | 2/2016 | Sankar et al. |
| 2016/0050233 A1 | 2/2016 | Chen et al. |
| 2016/0088074 A1 | 3/2016 | Kannan et al. |
| 2016/0094470 A1 | 3/2016 | Skog |
| 2016/0105395 A1 | 4/2016 | Chen et al. |
| 2016/0105446 A1 | 4/2016 | Chen et al. |
| 2016/0119382 A1 | 4/2016 | Chen et al. |
| 2016/0139910 A1 | 5/2016 | Ramanathan et al. |
| 2016/0156708 A1 | 6/2016 | Jalan et al. |
| 2016/0164792 A1 | 6/2016 | Oran |
| 2016/0173579 A1 | 6/2016 | Jalan et al. |

FOREIGN PATENT DOCUMENTS

| | | |
|---|---|---|
| CN | 1529460 | 9/2004 |
| CN | 1575582 | 2/2005 |
| CN | 1714545 A | 12/2005 |
| CN | 1725702 | 1/2006 |
| CN | 101004740 A | 7/2007 |
| CN | 101094225 | 12/2007 |
| CN | 101163336 A | 4/2008 |
| CN | 101169785 A | 4/2008 |
| CN | 101189598 | 5/2008 |
| CN | 101193089 A | 6/2008 |
| CN | 101247349 A | 8/2008 |
| CN | 101261644 A | 9/2008 |
| CN | 102143075 A | 8/2011 |
| CN | 102546590 | 7/2012 |
| CN | 102571742 | 7/2012 |
| CN | 102577252 | 7/2012 |
| CN | 102918801 | 2/2013 |
| CN | 103533018 A | 1/2014 |
| CN | 103944954 | 7/2014 |
| CN | 104040990 | 9/2014 |
| CN | 104067569 | 9/2014 |
| CN | 104106241 | 10/2014 |
| CN | 104137491 | 11/2014 |
| CN | 104796396 A | 7/2015 |
| CN | 102577252 B | 3/2016 |
| CN | 102918801 B | 5/2016 |
| CN | 102571742 B | 7/2016 |
| EP | 1209876 A2 | 5/2002 |
| EP | 2647174 | 10/2003 |
| EP | 1770915 A1 | 4/2007 |
| EP | 1885096 A1 | 2/2008 |
| EP | 02296313 | 3/2011 |
| EP | 2577910 | 4/2013 |
| EP | 2622795 | 8/2013 |
| EP | 2760170 | 7/2014 |
| EP | 2772026 | 9/2014 |
| EP | 2901308 A2 | 8/2015 |
| EP | 2760170 B1 | 12/2015 |
| HK | 1182560 | 11/2013 |
| HK | 1183569 A | 12/2013 |
| HK | 1183996 A | 1/2014 |
| HK | 1189438 | 6/2014 |
| HK | 1198565 A1 | 5/2015 |
| HK | 1198848 A1 | 6/2015 |
| HK | 1199153 A1 | 6/2015 |
| HK | 1199779 A1 | 7/2015 |
| HK | 1200617 A1 | 8/2015 |
| IN | IN3764CHN2014 | 9/2015 |
| IN | 261CHE2014 A | 7/2016 |
| IN | 1668CHENP2015 A | 7/2016 |
| JP | H09-097233 | 4/1997 |
| JP | 1999096128 | 4/1999 |
| JP | H11-338836 | 10/1999 |
| JP | 2000276432 A | 10/2000 |
| JP | 2000307634 A | 11/2000 |
| JP | 2001051859 A | 2/2001 |
| JP | 2001298449 A | 10/2001 |
| JP | 2002091936 A | 3/2002 |
| JP | 2003141068 A | 5/2003 |
| JP | 2003186776 A | 7/2003 |
| JP | 2005141441 A | 6/2005 |
| JP | 2006332825 A | 12/2006 |
| JP | 2008040718 A | 2/2008 |
| JP | 2009500731 A | 1/2009 |
| JP | 2013528330 | 5/2011 |
| JP | 2014504484 A | 2/2014 |
| JP | 2014-143686 | 8/2014 |
| JP | 2015507380 A | 3/2015 |
| JP | 5855663 B2 | 12/2015 |
| JP | 5913609 B2 | 4/2016 |
| JP | 5946189 B2 | 6/2016 |
| JP | 5963766 B2 | 8/2016 |
| KR | 10-0830413 B1 | 5/2008 |
| KR | 1020120117461 | 8/2013 |
| KR | 1020080008340 A | 10/2014 |
| KR | 101576585 B1 | 12/2015 |
| KR | 101632187 | 6/2016 |
| KR | 101692751 B1 | 1/2017 |
| WO | 01/13228 A2 | 2/2001 |
| WO | 0114990 | 3/2001 |
| WO | WO0145349 | 6/2001 |
| WO | 03103237 | 12/2003 |
| WO | WO2004084085 A1 | 9/2004 |
| WO | WO2006098033 A1 | 9/2006 |
| WO | 2008053954 | 5/2008 |
| WO | WO2008078593 A1 | 7/2008 |

(56) References Cited

FOREIGN PATENT DOCUMENTS

| WO | 2011049770 A2 | 4/2011 |
|---|---|---|
| WO | WO2011079381 A1 | 7/2011 |
| WO | 2011149796 A2 | 12/2011 |
| WO | 2012050747 | 4/2012 |
| WO | 2012075237 A2 | 6/2012 |
| WO | WO2012083264 A2 | 6/2012 |
| WO | WO2012097015 A2 | 7/2012 |
| WO | 2013070391 A1 | 5/2013 |
| WO | 2013081952 A1 | 6/2013 |
| WO | 2013096019 A1 | 6/2013 |
| WO | 2013112492 | 8/2013 |
| WO | WO2013189024 A1 | 12/2013 |
| WO | WO2014031046 A1 | 2/2014 |
| WO | 2014052099 | 4/2014 |
| WO | 2014088741 | 6/2014 |
| WO | 2014093829 | 6/2014 |
| WO | 2014138483 | 9/2014 |
| WO | 2014144837 | 9/2014 |
| WO | WO 2014179753 | 11/2014 |
| WO | WO2015153020 A1 | 10/2015 |

OTHER PUBLICATIONS

Kjaer et al. "Resource allocation and disturbance rejection in web servers using SLAs and virtualized servers", IEEE Transactions on Network and Service Management, IEEE, US, vol. 6, No. 4, Dec. 1, 2009.

Sharifian et al. "An approximation-based load-balancing algorithm with admission control for cluster web servers with dynamic workloads", The Journal of Supercomputing, Kluwer Academic Publishers, BO, vol. 53, No. 3, Jul. 3, 2009.

Cardellini et al., "Dynamic Load Balancing on Web-server Systems", IEEE Internet Computing, vol. 3, No. 3, pp. 28-39, May-Jun. 1999.

Goldszmidt et al. NetDispatcher: A TCP Connection Router, IBM Research Report RC 20853, May 19, 1997.

Koike et al., "Transport Middleware for Network-Based Control," IEICE Technical Report, Jun. 22, 2000, vol. 100, No. 53, pp. 13-18.

Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.

Abe et al., "Adaptive Split Connection Schemes in Advanced Relay Nodes," IEICE Technical Report, Feb. 22, 2010, vol. 109, No. 438, pp. 25-30.

Gite, Vivek, "Linux Tune Network Stack (Buffers Size) to Increase Networking Performance," nixCraft [online], Jul. 8, 2009 [retrieved on Apr. 13, 2016], Retreived from the Internt: <URL:http://www.cyberciti.biz/faq/linux-tcp-tuning/>.

FreeBSD, "tcp—TCP Protocol," Linux Programmer's Manual [online], Nov. 25, 2007 [retreived on Apr. 13, 2016], Retreived from the Internet: <URL:https://www.freebsd.org/cgi/man.cgi?query=tcp&apropos=0&sektion=7&manpath=SuSE+Linux%2Fi386+11.0&format=asci>.

\* cited by examiner

DISTRIBUTING APPLICATION TRAFFIC TO SERVERS BASED ON DYNAMIC SERVICE RESPONSE TIME

BACKGROUND OF THE INVENTION

Field

This invention relates generally to data communications, and more specifically, to a method and system for distributing application traffic to servers based on service process parameters.

Background

Web services and cloud computing are deployed in an unprecedented pace. New servers are unloaded and installed at datacenters every day. Demands of web services and corporate computing come from all directions. Consumer oriented services include smartphone apps, mobile applications such as location based services, turn-by-turn navigation services, e-book services such as Kindle™, video applications such as YouTube™ or Hulu™, music applications such as Pandora™ or iTunes™, Internet television services such as Netflix™, and many other fast growing consumer Web services. On the corporate front, cloud computing based services such as Google™ docs, Microsoft™ Office Live and Sharepoint™ software, Salesforce.Com™'s on-line software services, tele-presence and web conferencing services, and many other corporate cloud computing services.

As a result more and more servers are deployed to accommodate the increasing computing needs. Traditionally these servers are managed by a service gateway such as Application Delivery Controller or Server Load Balancer (ADC/SLB) are typically network appliances in a fixed module or in a Chassis or a software module running in a commoditized server ADC/SLB manage the application traffic to servers based on incoming service requests. Common methods to distribute traffic among servers is to distribute the service requests based on the applications (HTTP, FTP, HTTPS etc.), service addresses such as URL, priorities based on network interfaces or host IP addresses. ADC/SLB may distribute the service requests to a server assuming the server is fully available to handle the service requests. Typically a fully loaded server does not handle service requests well. In fact, most if not all service requests suffer delay or no service available when a server is busy. It is often better not to further distribute service request to a busy server. Current ADC/SLB allows a network administrator to set a maximum service session capacity so that ADC/SLB does not send more than the maximum capacity service requests to the server. However, statically configured limitation on a server cannot fully utilize the server's capacity and not all service requests require the same processing from the server. It is beneficial for an ADC/SLB to determine if a server is busy based on the service response time from a server such that the ADC/SLB can reduce sending further service requests to the server.

Therefore, there is a need for a system and method for an ADC/SLB to protect a server overloading based on dynamic service response time.

BRIEF SUMMARY OF THE INVENTION

According to one embodiment of the present invention, a method for processing a service request received from a host, comprises: (a) relaying the service request from a service gateway to a server over a service session between the service gateway and the server; (b) determining by the service gateway a service request time for the service session; (c) receiving by the service gateway a service response from the server; (d) determining by the service gateway a service response time; (e) calculating by the service gateway a service processing time for the service request from the service request time and the service response time; (f) comparing the service processing time with an expected service processing time; and (g) updating a server busy indicator for the server in response to the comparing.

In one aspect of the present invention, the updating (g) comprises: (g1) in response to determining that the service processing time exceeds the expected service processing time, updating the server busy indicator by the service gateway to indicate that the server is busy; and (g2) in response to determining that the service processing time does not exceed the expected service processing time, updating the server busy indicator by the service gateway to indicate that the server is not busy.

In one aspect of the present invention, the calculating (e) comprises: (e1) calculating by the service gateway the service processing time for the service request as a duration between the service request time and the service response time.

In one aspect of the present invention, the service response comprises an error indication, wherein the service gateway does not calculate the service processing time if the error indication indicates an error.

In one aspect of the present invention, the comparing (f) comprises: (f1) configuring the expected service processing time by the service gateway according to a service attribute of the service request or the server.

In one aspect of the present invention, the expected service processing time is associated with the service attribute and stored in a datastore, wherein the configuring (f1) comprises: (f1i) comparing by the service gateway the service request or the server with the service attribute in the datastore; and (f1ii) if the service request or the server matches the service attribute in the datastore, retrieving the expected service processing time associated with the matching service attribute.

In one aspect of the present invention, the comparing (f) further comprises: (f2) calculating an adjusted expected service processing time based on the service processing times of previous service sessions between the secure gateway and the server.

In one aspect of the present invention, the relaying (a) comprises: (a1) receiving the service request from the host by the service gateway; (a2) checking the server busy indicator for the server by the service gateway; (a3) in response to determining that the server busy indicator indicates that the server is busy, placing the service request in a service request buffer by the service gateway; and (a4) in response to determining that the server busy indicator indicates that the server is not busy, relaying the service request from the service gateway to the server over the service session between the service gateway and the server.

In one aspect of the present invention, the relaying (a4) comprises: (a4i) checking if the service request buffer is empty by the service gateway; (a4ii) in response to determining that the service request buffer is empty, relaying the service request from the service gateway to the server over the service session between the service gateway and the server; and (a4iii) in response to determining that the service request buffer is not empty, placing the service request in the service request buffer by the service gateway.

In one aspect of the present invention, the placing (a3) comprises: (a3i) determining by the service gateway if a timer at the service gateway has expired; and (a3ii) in response to determining that the timer has expired, relaying the service request from the service gateway to the server over the service session between the service gateway and the server.

In one aspect of the present invention, the service request is associated with a priority, wherein the server request buffer is configured to store service requests associated with the priority, wherein the placing (a3) comprises: (a3i) placing the service request in the service request buffer by the service gateway; and (a3ii) relaying the service request in the service request buffer from the service gateway to the server according to the associated priority.

System and computer program products corresponding to the above-summarized methods are also described and claimed herein.

DETAILED DESCRIPTION OF THE INVENTION

Figure 1:
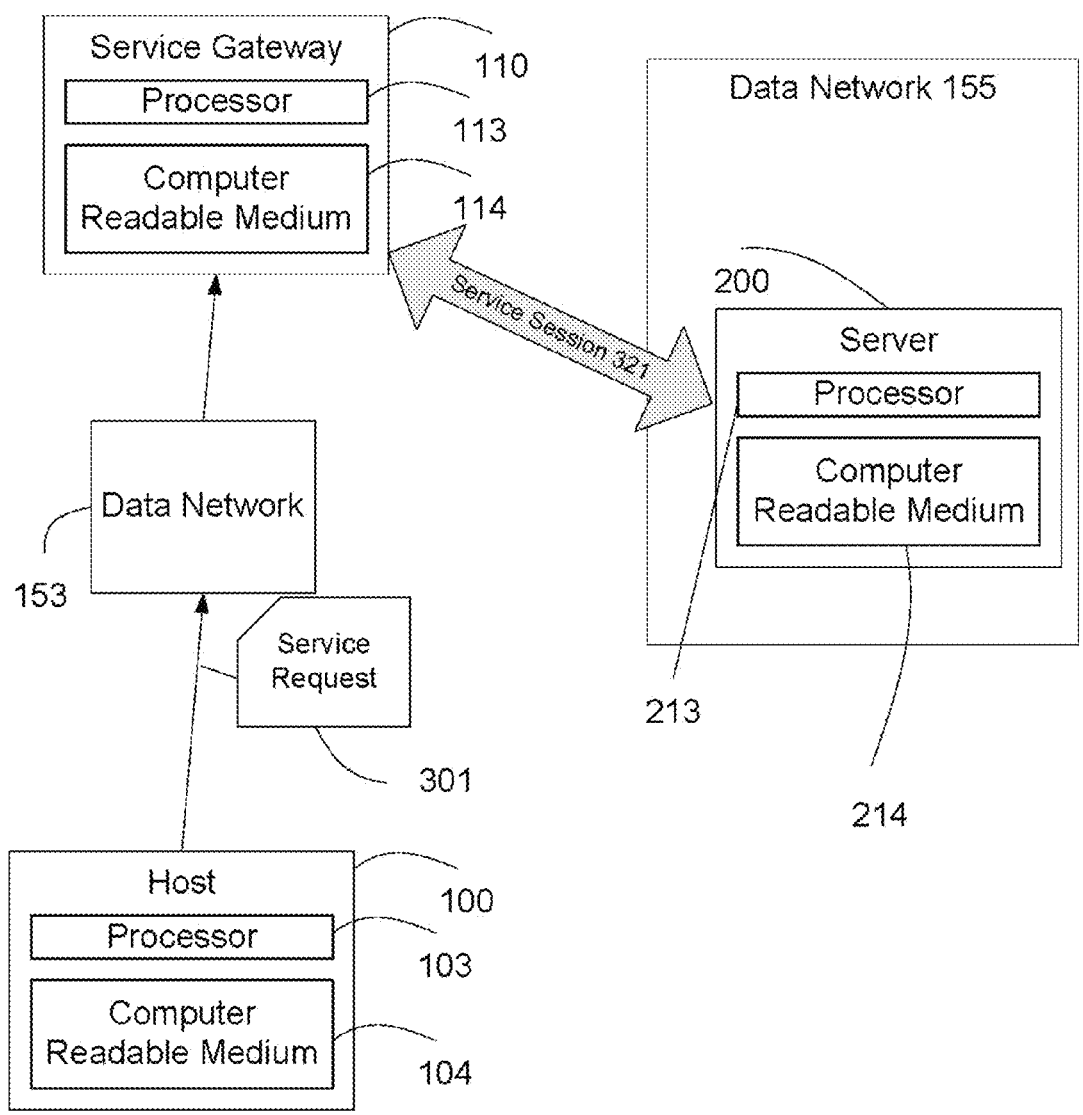
FIG. 1 illustrates a service session between a service gateway and a server.

The invention can take the form of an entirely hardware embodiment, an entirely software embodiment or an embodiment containing both hardware and software elements. In a preferred embodiment, the invention is implemented in software, which includes but is not limited to firmware, resident software, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates a service session 321 between a service gateway 110 and a server 200. The service gateway 110 receives a service request 301 from a host 100. Service request 301 is delivered over a data network 153. In one embodiment, service request 301 is a Web service request such as a HTTP (Hypertext Transport Protocol) request, a secure HTTP request, a FTP (File Transfer Protocol) request, a file transfer request, a SIP (Session Initiation Protocol) session request, a request based on Web technology, a video or audio streaming request, a Web conferencing session request, or any request over the Internet or corporate network.

Host 100 is a computing device with network access capabilities. The host 100 is operationally coupled to a processor 103 and a computer readable medium 104. The computer readable medium 104 stores computer readable program code for implementing the various embodiments of the present invention as described herein. In one embodiment, host 100 is a workstation, a desktop personal computer or a laptop personal computer. In one embodiment, host 100 is a Personal Data Assistant (PDA), a smartphone, or a cellular phone. In one embodiment, host 100 is a set-top box, an Internet media viewer, an Internet media player, a smart sensor, a smart medical device, a net-top box, a networked television set, a networked DVR, a networked Blu-ray player, or a media center.

In one embodiment, data network 153 is an Internet Protocol (IP) network. In one embodiment, data network 153 is a corporate data network or a regional corporate data network. In one embodiment, data network 153 is an Internet service provider network. In one embodiment, data network 153 is a residential data network. In one embodiment, data network 153 includes a wired network such as Ethernet. In one embodiment, data network 153 includes a wireless network such as a WiFi network, or cellular network.

The service gateway 110 is operationally coupled to a processor 113 and a computer readable medium 114. The computer readable medium 114 stores computer readable program code, which when executed by the processor 113, implements the various embodiments of the present invention as described herein. In some embodiments, service gateway 110 is implemented as a server load balancer, an application delivery controller, a service delivery platform, a traffic manager, a security gateway, a component of a firewall system, a component of a virtual private network (VPN), a load balancer for video servers, or a gateway to distribute load to a plurality of servers.

Server 200 is operationally coupled to a processor 213 and a computer readable medium 214. The computer readable medium 214 stores computer readable program code, which when executed by the processor 213, implements the various embodiments of the present invention as described herein. In some embodiments, the computer readable program code implements server 200 as a Web server, a file server, a video server, a database server, an application server, a voice system, a conferencing server, a media gateway, a SIP server, a remote access server, a VPN server, or a media center.

Service gateway 110 connects to server 200 via data network 155. In one embodiment, data network 155 is the same as data network 153. In one embodiment, data network 155 is different from data network 153. In one embodiment, host 100 does not have direct access to data network 155. In one embodiment, host 100 has direct access to data network 155.

Figure 2:
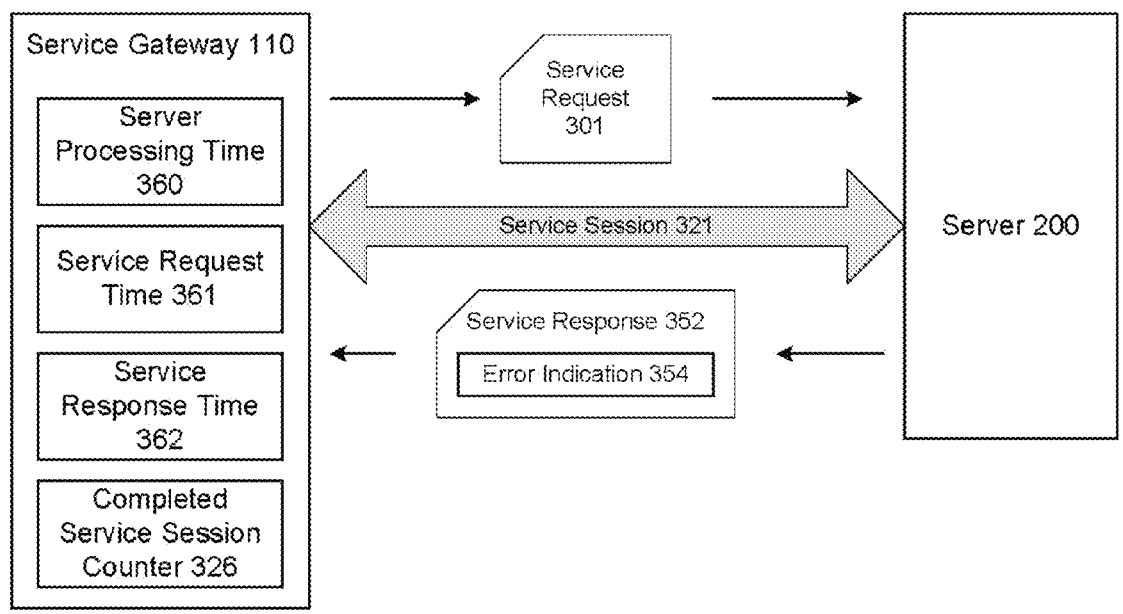
FIG. 2 illustrates an embodiment of a method for processing a service request by a service gateway.
Figure 7:
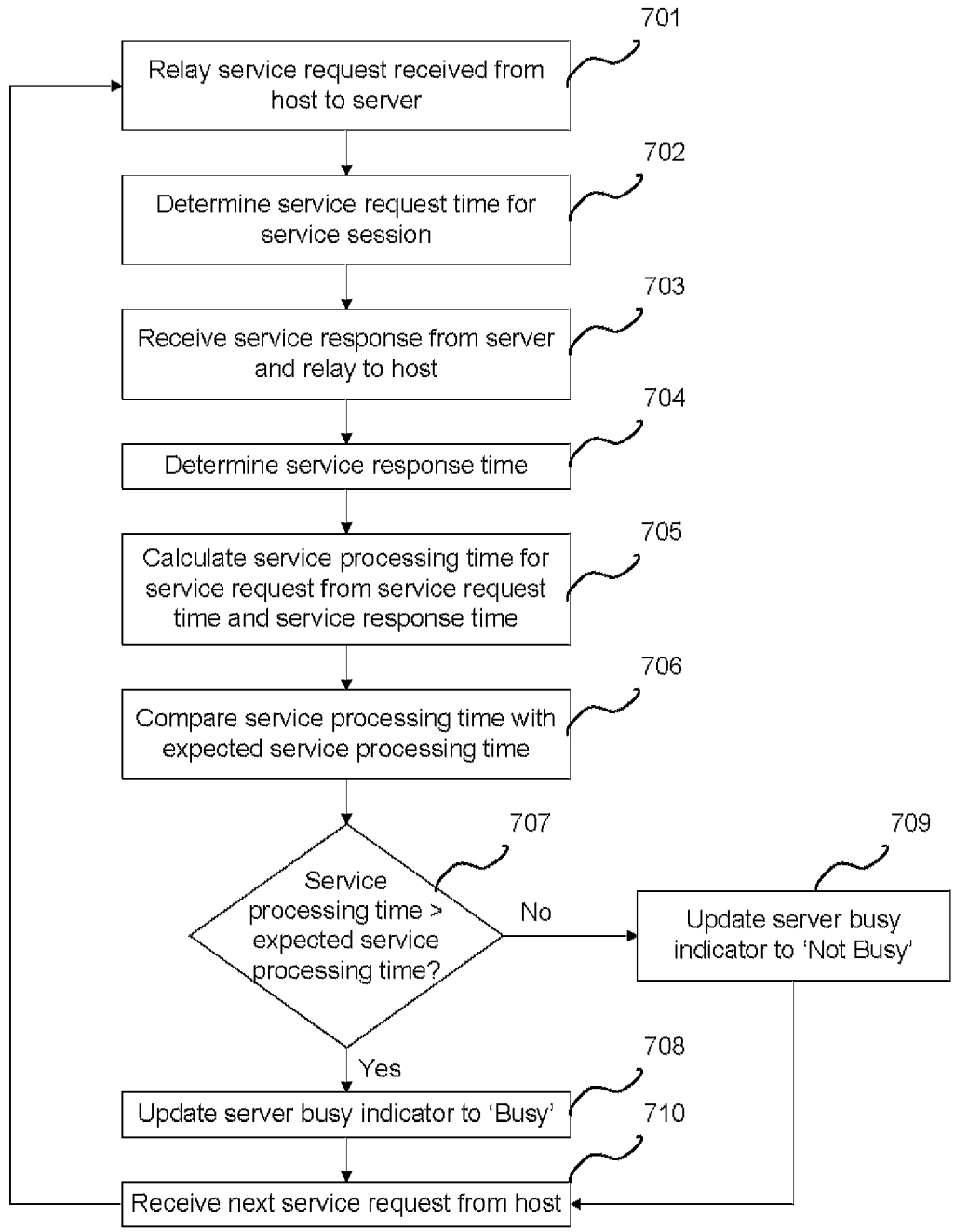
FIG. 7 is a flowchart illustrating an embodiment of a method for processing a service request by a service gateway.

FIGS. 2 and 7 illustrate an embodiment of a method for processing a service request 301 by service gateway 110. In an embodiment, service gateway 110 receives service request 301 from host 100, and relays service request 301 to server 200 (701) by establishing service session 321 between service gateway 110 and server 200. Service gateway 110 determines a service request time 361 for service session 321 (702). In one embodiment the service request time 361 is a time stamp such as a time of the day, a system time, a time counter. In one embodiment service request time 361 is a time when service gateway 110 sends service request 301 to server 200. In one embodiment, service request time 361 is a time when service gateway 110 receives from server 200 an acknowledgement of receiving service request 301.

After server 200 processes service request 301, server 200 responds with a service response 352. In one embodiment, service response 352 includes a web page, a document, a file, a picture, a streaming of audio or video signals, or a voice call. In one embodiment, service response 352 includes an error indication 354. Error indication 354 may include a HTTP error status code, a FTP error code, SIP error message, or any other error code.

Service gateway 110 receives service response 352 and relays the service response 352 to host 100 (703). Service gateway 110 determines service response time 362 upon receipt of service response 352 (704). In an embodiment, service response time 362 is a time stamp such as a time of the day, a system time, a time counter, and is compatible with service request time 361. In one embodiment, service response time 362 is a time when service gateway 110 receives service response 352. In one embodiment, service response time 362 is a time when service gateway 110 receives first piece of information of service response 352. In one embodiment, service response time 362 is a time when service gateway 110 receives the last piece of information of service response 352. In one embodiment, service response time 362 is a time when service gateway 110 disconnects service session 321 from server 200. In one embodiment, service response time 362 is included in service response 352.

After determining service request time 361 and service response time 362, service gateway 110 calculates service processing time 360 for service request 301 from the service request time and service response time (705). Service processing time 360 typically measures the duration between service request time 361 and service response time 362. In one example, service gateway 110 subtracts service request time 361 from service response time 362 to obtain service processing time 360. In another example, service gateway 110 calculates the duration between service request time 361 and service response time 362 to determine service process time. For example, service processing time 360 is 10 milliseconds, 5 milliseconds, 247 milliseconds, 3 seconds, 15 seconds, 1 minute, 75 microseconds, or 289 units of time.

In one embodiment, service gateway 110 verifies service response 352 prior to calculating service processing time 360. In an example, service gateway 110 verifies service response 352 if the response contains an error indication 354. In one embodiment, if there is an error indicated in error indication 354, service gateway 110 does not calculate service processing time 360 for the service request 301.

In one embodiment, service gateway 110 includes a completed service session counter 326, which counts the number of completed service sessions between service gateway 110 and server 200. In one embodiment, service gateway 110 increments the completed service session counter 326 by 1 after service gateway 110 receives service response 352 or after service gateway 110 disconnects service session 321 from server 200. In one embodiment, service gateway 110 increments the completed service session counter 326 by 1 after determining service processing time 360.

Figure 3:
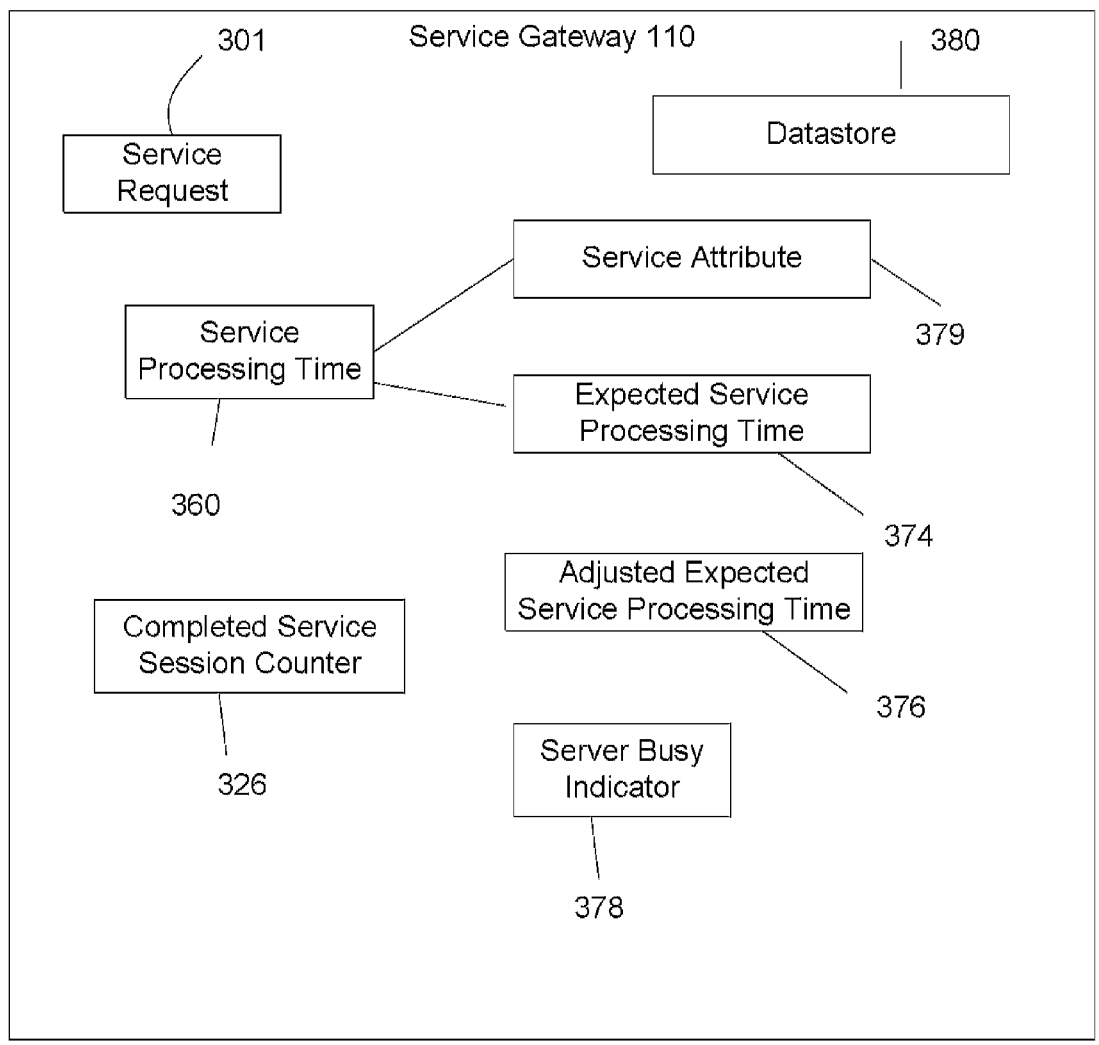
FIG. 3 illustrates an embodiment of a method for determining if server is busy.

FIG. 3 illustrates an embodiment of a method for determining if server 200 is busy. Service gateway 110 includes a server busy indicator 378 for server 200, indicating if server 200 is busy. In one embodiment, a value of 0 or 'Not Busy' for server busy indicator 378 indicates server 200 is not busy while a value of 1 or 'Busy' indicates server 200 is busy. Service gateway 110 updates server busy indicator 378 based on service processing time 360.

Service gateway 110 includes an expected service processing time 374. Referring to both FIGS. 3 and 7, service gateway 110 compares service processing time 360 with expected service processing time 374 (706). In response to determining that the service processing time exceeds expected service processing time 374, service gateway 110 updates server busy indicator 378 to 'Busy' (708). Service processing time 360 may need to be at least 50% larger than expected service processing time 374 in order to exceed expected service processing time 374. In various embodiments, service processing time 360 is at least 300% larger than expected service processing time 374. Service processing time 360 may be larger than expected service processing time 374. After updating server busy indicator 378, service gateway 110 receives a next service request from host 100.

Service gateway 110 determines whether service processing time 360 is less than expected service processing time 374 (707), and in response, service gateway 110 updates server busy indicator 378 to 'Not Busy' (709). After updating server busy indicator 378, service gateway 110 receives a next service request from host 100.

Expected service processing time 374 may be based on service request 301. In various embodiments, service request 301 comprises a service request Universal Resource Locator (URL), and expected service processing time 374 is configured according to a service attribute 379. The service attribute 379 is an attribute affecting the expected service processing time 374. For example, different protocols would process service requests at different rates, and thus would have different expected service processing times. Service attribute 379 is based on service request URL, or part of service request URL such as the domain name, a web folder name in the web site, a document type, or a protocol indicated in service request URL. For example, if a hypothetical service request URL is "http://www.abc.com/shops/shoe.html". Service attribute 379 is based on domain name "www.abc.com", web folder "www.abc.com/shops", document type.html (or other document type such as .php, .asp, etc.), protocol http (or other protocols such as ftp, https, sip etc.). Service attribute 379 may also be related to program code implemented on server 200. For example, server 200 is a web server using Apache web server software, Microsoft web server software, Oracle web server software or other web server software. Service attribute 379 is related to the web server software.

In various embodiments, service attribute 379 is based on the domain name and the expected service processing time 374 is 10 milliseconds. Service attribute 379 may also be based on HTTP protocol with an expected service processing time 374 of 75 milliseconds. In other embodiments, service attribute 379 is based on FTP file download protocol and the expected service processing time 374 is 2 minutes. In still other embodiments, service attribute 379 is based on HTML document type and the expected service processing time 374 is 20 milliseconds.

In one embodiment, service attribute 379 relates to program code implemented on server 200. In an embodiment, server 200 uses Apache web server software and expected processing time is 50 milliseconds. In an embodiment, server 200 uses Microsoft web server software and expected processing time is 90 milliseconds.

In one embodiment, service attribute 379 relates to a plurality of attributes mentioned in above description. Expected processing time may be determined by a summation of a plurality of expected processing times for the plurality of attributes.

In one embodiment, service gateway 110 includes a datastore 380, which stores the expected service processing time 374 and associated service attribute 379. In an embodiment, service gateway 110 compares service request 301 or server 200 against service attribute 379 in datastore 380. If there is a match, service gateway 110 retrieves expected service processing time 374 associated with the matched service attribute 379, and compares the retrieved expected service processing time 374 with the service processing time 360. In one embodiment, expected service processing time 374 is not related to any service attribute. Service gateway 110 retrieves expected service processing time 374 and compares to service processing time 360.

In one embodiment, expected service processing time 374 is configured by a user.

In one embodiment, expected service processing time 374 is automatically determined based on service processing times of previous service sessions. Upon determining service processing time 360, service gateway 110 calculates an adjusted expected service processing time 376 by using the formula:

$$\text{adjusted expected service processing time} = \frac{\left(\begin{array}{c}\text{expected service processing time} *\\ (\text{completed service session counter} - 1)\end{array}\right) +}{\text{completed service session counter}}$$

Service gateway 110 calculates adjusted expected service processing time 376 prior to changing completed service session counter 326. Service gateway 110 does not adjust expected service processing time 374 if service processing time 360 exceeds expected service processing time 374, or if service response 352 includes an error indication 354. In this embodiment, service gateway 110 does not change completed service session counter 326.

In one embodiment, expected service processing time 374 is associated with service attribute 379. Completed service session counter 326 is also associated with service attribute 379 in order to implement separate counters for each service attribute. Service gateway 110 checks if service request 301 or server 200 matches service attribute 379 prior to calculating adjusted expected service processing time 376.

In one embodiment, service gateway 110 replaces expected service processing time 374 with adjusted expected service processing time 376. The adjusted expected service processing time 376 becomes the expected service processing time 374 for the next service session between the service gateway 110 and the server 200.

After the service gateway 110 updates server busy indication, the service gateway 110 receives a next service request from the host (71) and the process repeats (710).

Figure 4:
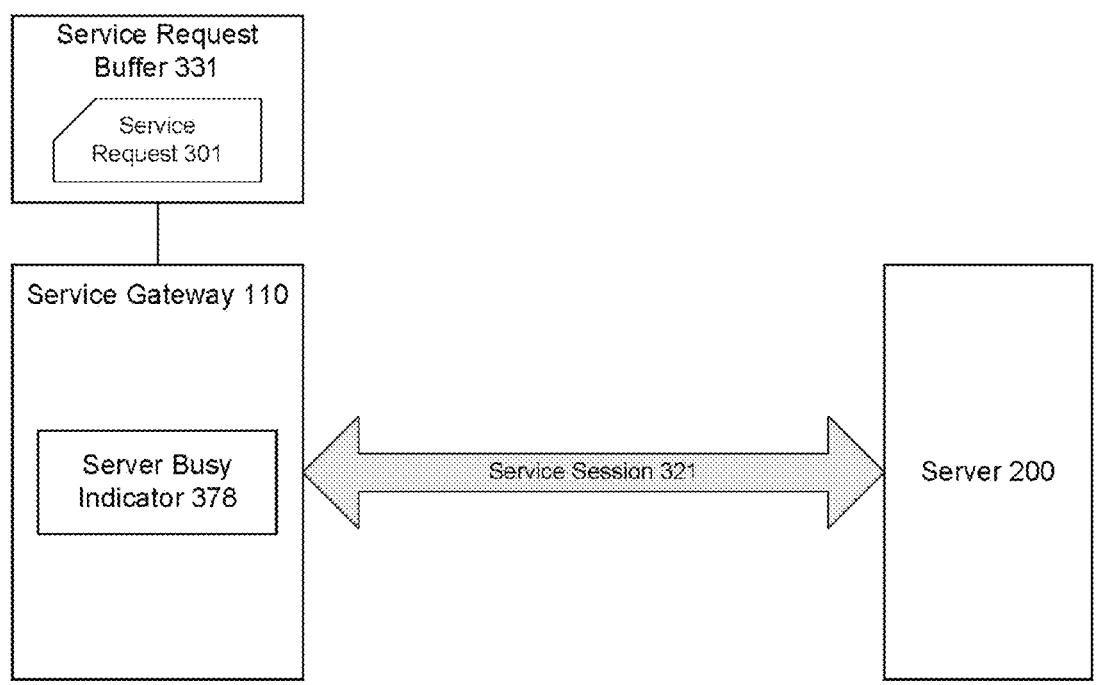
FIG. 4 illustrates an embodiment of a method for processing service request based on server busy indicator.
Figure 8:
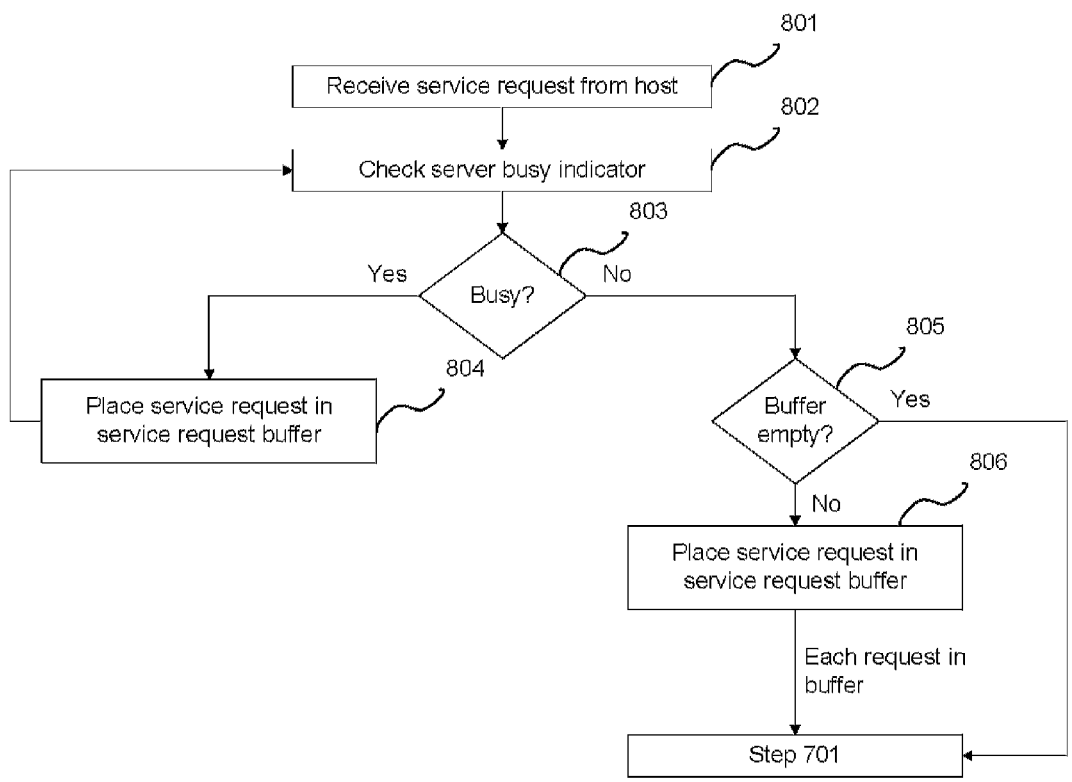
FIG. 8 is a flowchart illustrating an embodiment of a method for processing service request based on server busy indicator.

FIGS. 4 and 8 illustrate an embodiment of a method for processing service request 301 based on server busy indicator 378. Service gateway 110 includes a service request buffer 331. Service gateway 110 receives service request 301 from host 100 (801). Service gateway 110 puts service request 301 into service request buffer 331. In other embodiments, service gateway 110 checks server busy indicator 378 (802). When the server busy indicator 378 indicates server 200 is 'Busy' (803), service gateway 110 places service request 301 into service request buffer 331 (804). When server busy indicator 378 indicates server 200 is 'Not Busy' (803), service gateway 110 relays service request 301 to server 200 (701), as described above with FIGS. 2 and 7. In yet another embodiment, when server busy indicator 378 indicates server 200 is 'Not Busy', service gateway 110 checks if service request buffer 331 is empty (805). If service request buffer 331 is empty, service gateway 110 relays service request 301 to server 200 (701). If service request buffer 331 is not empty, the service gateway 110 places service request 301 into service request buffer 331 (806). The service gateway 110 then relays each service request in the service request buffer 331 to server 200 (701) until the service request buffer 331 is empty or until the server busy indicator 378 is changed to 'Busy'.

Figure 5:
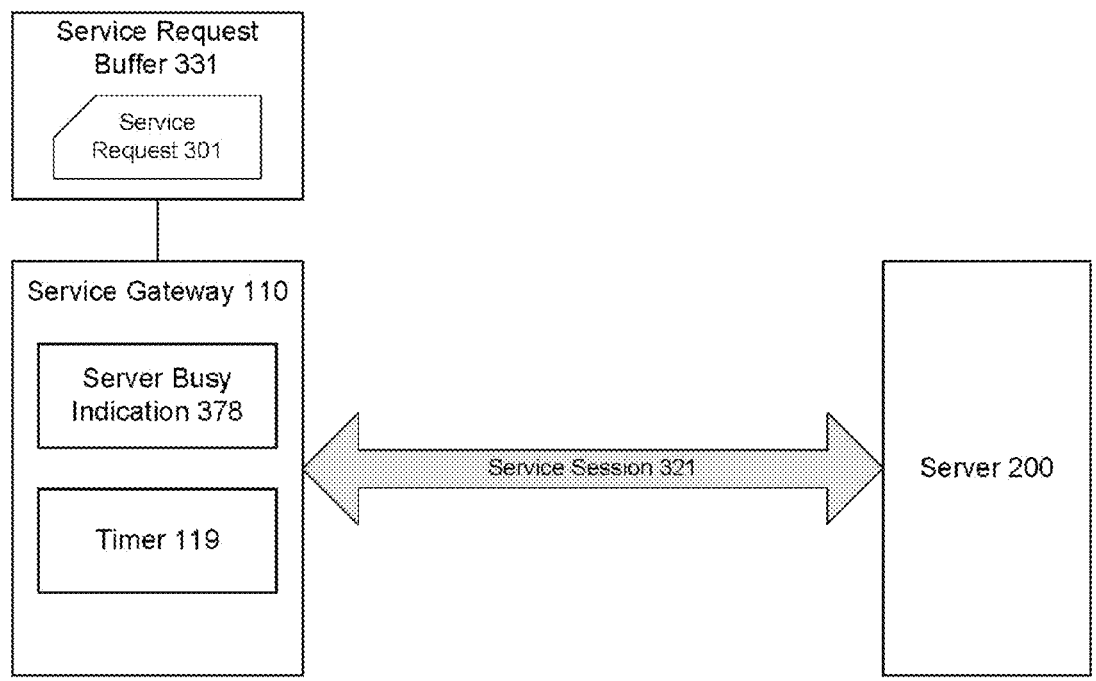
FIG. 5 illustrates an embodiment of a method for processing service requests after service gateway updates server busy indicator.

FIG. 5 illustrates an embodiment of a method for processing service requests after service gateway 110 updates server busy indicator 378. Service gateway 110 processes service request 301 in service request buffer 331 according to different values of server busy indicator 378. In one embodiment, server busy indicator 378 has an updated value of 'Not Busy'. Service gateway 110 examines service request buffer 331 and finds service request 301. Service gateway 110 replays service request 301 to server 200 (701).

In one embodiment, server busy indicator 378 has an updated value of 'Busy'. In one embodiment, service gateway 110 does not immediately process service request buffer 331. Service gateway 110 includes a timer 119. When timer 119 expires, service gateway 110 finds the service request 301 in the service request buffer 331 and relays service request 301 in service request buffer 331 to server 200 (701). Timer 119 may be configured for duration of, for example, 1 minute, 30 seconds, 1 second, 400 milliseconds, 5 milliseconds, 300 microseconds, or any other duration such that service to service request 301 is not severely affected. In one embodiment, time duration is based on attributes of the service request 301.

Figure 6:
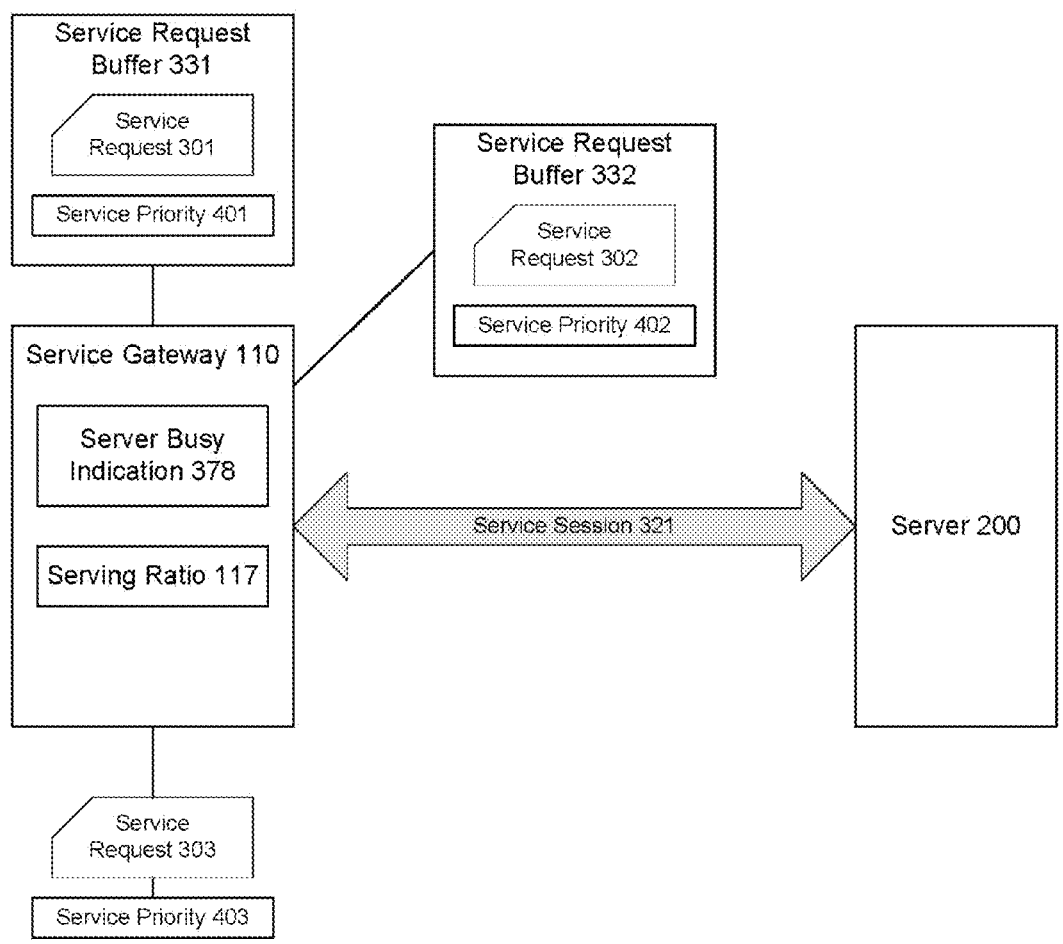
FIG. 6 illustrates an embodiment of a method for processing service requests based on a service priority.

FIG. 6 illustrates an embodiment of a method for processing service requests based on a service priority. In one embodiment, service request 303 is associated with a service priority 403. In a scenario, service priority 403 is based on service request 303 URL. In one scenario, service priority 403 is based on host 100, such as host 100 IP address, host 100 user identity. In one scenario, service priority 403 is associated to the network interface from which service gateway 110 receives service request 303. Service gateway 110 determines service priority 403 of service request 303.

Service request buffer 331 is configured to store service requests with service priority 401. In the embodiment where server busy indicator 378 has an updated value of 'Busy', service gateway 110 compares service priority 403 to service priority 401. In response to finding a match, service gateway 110 places service request 303 into service request buffer 331.

In one embodiment, service gateway 110 includes a second service request buffer 332. Service request buffer 332 is configured to store service request with service priority 402, which is higher than service priority 401.

In the embodiment where server busy indicator 378 has an updated value of 'Not Busy', service gateway 110 processes service requests in service request buffer 332 prior to service request buffer 331. In one embodiment, service gateway 110 sends service request 302 in service request buffer 332 to server 200 prior to sending service request 301 in service request buffer 331 to server 200.

In one embodiment, service gateway 110 processes all service requests from service request buffer 332 before processing service request buffer 331. In one embodiment, service gateway 110 includes a serving ratio 117 wherein service gateway 110 processes service request buffer 332 and service request buffer 331 according to ratio 117, where serving ratio 117 favors high priority service request buffer 332 to the lower priority service request buffer 331 in order to avoid starving the lower priority service requests in service request buffer 331.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for distributing application traffic received by a service gateway from a host to a server of a plurality of servers, based on dynamic service response time of the server, the method comprising:

receiving a first service request for a service session from the host by the service gateway;

determining by the service gateway a service request time for the service session;

relaying the first service request from the service gateway to a first server of the plurality of servers, the relaying occurring over the service session between the service gateway and the first server;

receiving by the service gateway a service response from the first server;

determining by the service gateway a service response time;

calculating by the service gateway a dynamic service processing time for the first service request from the service request time and the service response time;

comparing the dynamic service processing time with an expected service processing time for the first server to determine whether the dynamic service processing time exceeds the expected service processing time by at least a threshold amount, wherein the expected service processing time is determined by the service gateway according to a service attribute of the first service request or according to a service attribute of the first server, wherein the expected service processing time is based on the service attribute of the first service request or a service attribute of the first server and stored in a datastore, wherein the determining the expected service processing time comprises:

comparing by the service gateway the first service request or the first server with the service attribute in the datastore; and if the first service request or the first server matches the service attribute in the datastore, retrieving the expected service processing time associated with the matching service attribute, wherein the expected service processing time is variable based on the matching service attribute;

updating a server busy indicator for the first server in response to the comparing, wherein a server busy indicator for each of the plurality of servers is maintained at the service gateway;

receiving a second service request from the host by the service gateway;

checking the server busy indicator for the first server by the service gateway;

in response to determining that the server busy indicator indicates that the first server is busy, placing the second service request in a service request buffer of the service gateway and maintaining a connection to the host; and in response to determining that the server busy indicator indicates that the first server is not busy, relaying the second service request from the service gateway to the first server over the service session between the service gateway and the first server.

2. The method of claim 1, wherein the updating the server busy indicator for the first server comprises:
in response to determining that the dynamic service processing time exceeds the expected service processing time, updating the server busy indicator by the service gateway to indicate that the first server is busy; and
in response to determining that the dynamic service processing time does not exceed the expected service processing time, updating the server busy indicator by the service gateway to indicate that the first server is not busy.

3. The method of claim 1, wherein the calculating by the service gateway the dynamic service processing time for the first service request comprises:
calculating by the service gateway the dynamic service processing time for the first service request as a duration between the service request time and the service response time.

4. The method of claim 1, wherein the service response comprises an error indication, and the service gateway does not calculate the dynamic service processing time if the error indication indicates an error.

5. The method of claim 1, wherein the comparing further comprises:
calculating an adjusted expected service processing time based on the dynamic service processing times of previous service sessions between the service gateway and the first server.

6. The method of claim 1, wherein the relaying the second service request from the service gateway to the first server over the service session between the service gateway and the first server comprises:
checking if the service request buffer is empty by the service gateway;
in response to determining that the service request buffer is empty, relaying the second service request from the service gateway to the first server over the service session between the service gateway and the first server; and
in response to determining that the service request buffer is not empty, placing the second service request in the service request buffer by the service gateway.

7. The method of claim 1, wherein the second service request is associated with a priority, wherein the service request buffer is configured to store service requests associated with the priority, wherein the placing the second service request in the service request buffer of the service gateway further comprises:
relaying the second service request in the service request buffer from the service gateway to a second server according to the associated priority.

8. The method of claim 1, wherein the service attribute is one or more of a URL, a protocol, domain name, web folder name, or document type.

9. A non-transitory computer readable storage medium having computer readable program code embodied therewith for processing a service request received from a host, the computer readable program code configured to:
receive a first service request for a service session from the host by a service gateway;
determine a service request time for the service session;
relay the first service request from the service gateway to a server over the service session between the service gateway and the server;
receive a service response from the server;
determine a service response time;
calculate a service processing time for the first service request from the service request time and the service response time;
compare the service processing time with an expected service processing time to determine whether the service processing time exceeds the expected service processing time by at least a threshold amount, wherein the expected service processing time is determined by the service gateway according to a service attribute of the first service request or the server, wherein the expected service processing time is associated with the service attribute and stored in a datastore, wherein the computer readable program code is configured to determine the expected service processing time according to the service attribute of the first service request or the server by:
comparing the first service request or the server with the service attribute in the datastore; and
if the first service request or the server matches the service attribute in the datastore, retrieving the expected service processing time associated with the matching service attribute, wherein the expected service processing time is variable based on the matching service attribute;
update a server busy indicator for the server in response to the comparing the service processing time with the expected service processing time, wherein the server busy indicator for the server is maintained at the service gateway;
receive a second service request from the host;
check the server busy indicator for the server;
in response to determining that the server busy indicator indicates that the server is busy, place the second service request in a service request buffer of the service gateway and maintain a connection to the host; and
in response to determining that the server busy indicator indicates that the server is not busy, relay the second service request from the service gateway to the server over the service session between the service gateway and the server.

10. The storage medium of claim 9, wherein the computer readable program code configured to update the server busy indicator for the server in response to the comparing is further configured to:
in response to determining that the service processing time exceeds the expected service processing time by at least the threshold amount, update the server busy indicator to indicate that the server is busy; and
in response to determining that the service processing time exceeds the expected service processing time by less than the threshold amount, update the server busy indicator to indicate that the server is not busy.

11. The storage medium of claim 9, wherein the computer readable program code configured to calculate the service processing time for the first service request from the service request time and the service response time is further configured to:
calculate the service processing time for the first service request as a duration between the service request time and the service response time.

12. The storage medium of claim 9, wherein the computer readable program code configured to compare the service processing time with the expected service processing time is further configured to:
　calculate an adjusted expected service processing time based on the service processing times of previous service sessions between the service gateway and the server.

13. The storage medium of claim 9, wherein the computer readable program code configured to relay the second service request from the service gateway to the server over the service session between the service gateway and the server in response to determining that the server busy indicator indicates that the server is not busy is further configured to:
　check to determine if the service request buffer is empty;
　in response to determining that the service request buffer is empty, relay the second service request from the service gateway to the server over the service session between the service gateway and the server; and
　in response to determining that the service request buffer is not empty, place the second service request in the service request buffer.

14. The storage medium of claim 9, wherein the computer readable program code configured to place the second service request in the service request buffer in response to determining that the server busy indicator indicates that the server is busy is further configured to:
　determine if a timer at the service gateway has expired, wherein the timer is determined by the service gateway according to a service attribute of the second service request or the server; and
　in response to determining that the timer has expired, relay the second service request from the service gateway to the server over the service session between the service gateway and the server.

15. The storage medium of claim 9, wherein the second service request is associated with a priority, wherein the service request buffer is configured to store service requests associated with the priority, wherein the computer readable program code configured to place the second service request in the service request buffer in response to determining that the server busy indicator indicates that the server is busy is further configured to:
　place the second service request in the service request buffer; and
　relaying the service request in the service request buffer from the service gateway to the server according to the associated priority.

16. The storage medium of claim 9, wherein the service attribute is one or more of a URL, a protocol, domain name, web folder name, or document type.

17. The storage medium of claim 9, wherein the expected service processing time is different for each service attribute.

18. A system, comprising:
　a server for processing service requests; and
　a service gateway comprising a processor and a computer readable storage medium having computer readable program code embodied therewith, wherein when the computer readable program code is executed by the processor, causes the service gateway to:
　　receive a first service request from a host;
　　determine a service request time for a service session;
　　relay the first service request to a server over the service session between the service gateway and the server;
　　receive a service response from the server;
　　determine a service response time;
　　calculate a service processing time for the first service request from the service request time and the service response time;
　　compare the service processing time with an expected service processing time to determine whether the service processing time exceeds the expected service processing time by at least a threshold amount, wherein the expected service processing time is determined by the service gateway according to a service attribute of the first service request or the server, wherein the expected service processing time is based on the service attribute and stored in a datastore, wherein the determining the expected service processing time according to the service attribute of the first service request or the server comprises:
　　　compare the first service request or the server with the service attribute in the datastore; and
　　　if the first service request or the server matches the service attribute in the datastore, retrieve the expected service processing time associated with the matching service attribute, wherein the expected service processing time is variable based on the matching service attribute;
　　update a server busy indicator for the server in response to the comparing the service processing time with the expected service processing time wherein the server busy indicator for the server is maintained at the service gateway;
　　receive a second service request from the host;
　　check the server busy indicator for the server;
　　in response to determining that the server busy indicator indicates that the server is busy, place the second service request in a service request buffer of the service gateway and maintain a connection to the host; and
　　in response to determining that the server busy indicator indicates that the server is not busy, relay the second service request from the service gateway to the server over the service session between the service gateway and the server.

19. The system of claim 18, wherein the update the server busy indicator for the server in response to the comparing comprises:
　in response to determining that the service processing time exceeds the expected service processing time by at least the threshold amount, update the server busy indicator to indicate that the server is busy; and
　in response to determining that the service processing time does not exceed the expected service processing time by at least the threshold amount, update the server busy indicator to indicate that the server is not busy.

20. The system of claim 18, wherein the compare the service processing time with the expected service processing time comprises:
　calculate an adjusted expected service processing time based on the service processing times of previous service sessions between the service gateway and the server.

21. The system of claim 18, wherein the service attribute is one or more of a URL, a protocol, domain name, web folder name, or document type.

* * * * *